Oct. 21, 1952     A. A. BRONOVICKI     2,615,074
CABLE PULLING EYE AND METHOD OF MAKING THE SAME
Filed Aug. 2, 1947
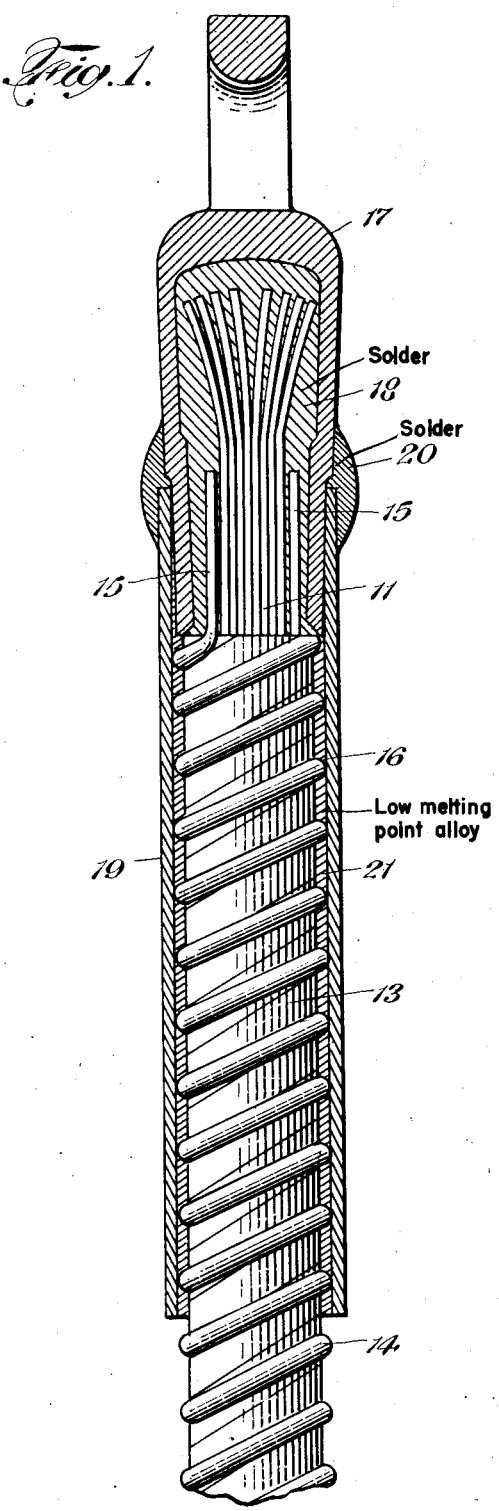
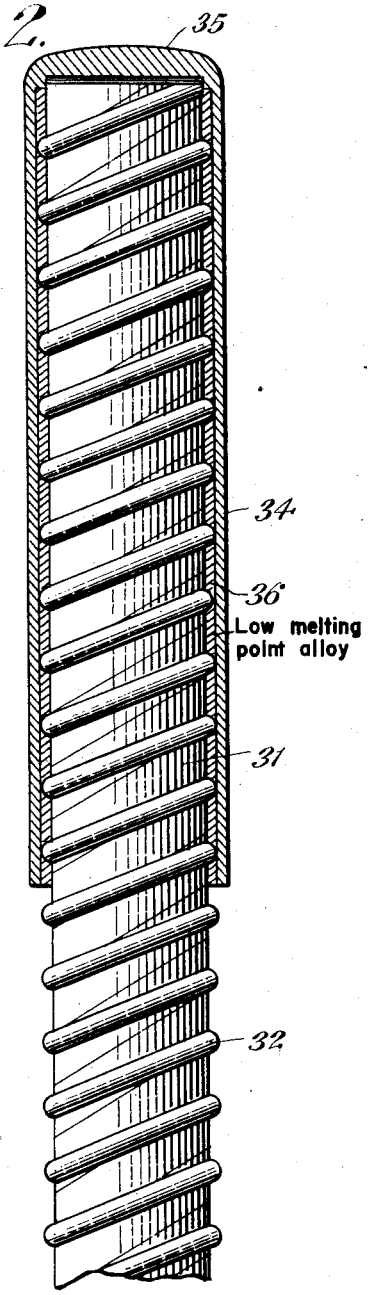
INVENTOR
Adam A. Bronovicki
BY
Emery Varney Whittemore & Dice
ATTORNEYS Patented Oct. 21, 1952

2,615,074

UNITED STATES PATENT OFFICE 2,615,074

CABLE PULLING EYE AND METHOD OF MAKING THE SAME

Adam A. Bronovicki, Bayonne, N. J., assignor to General Cable Corporation, New York, N. Y., a corporation of New Jersey Application August 2, 1947, Serial No. 765,708

5 Claims. (Cl. 174—10)

This invention relates to pulling eyes and end closures for electric cables and to a method of attaching the same and sealing the cable ends. The invention is particularly adapted for employment with non-leaded cables which are to be pulled into a pipe and the pipe then filled with an insulating fluid, liquid or gaseous, which will be maintained under pressure in excess of atmospheric.

It is an object of the invention to provide improved pulling eye and end seal connections for cables. It also is an object of the invention to provide improved methods of attaching pulling eyes to cables and of sealing cable ends against entrance of moisture. Other objects and advantages of the invention will appear hereinafter.

Cables which are to be installed in pipes generally are supplied in long lengths which are pulled into pipes previously laid in the ground. In order to pull the cable into the pipe it is necessary to attach a pulling eye to the conductor at one end of the cable. This usually is done at the factory during manufacture of the cable.

These cables commonly comprise one or more conductors insulated with oil-impregnated, laminated paper insulation. The cable insulation should be protected against excessive drainage of oil and against entrance of moisture into the cable insulation from the time of manufacture right up to the time the cable is pulled into the pipe. This necessitates the use of a suitable protective sheath or covering on the cable, or a sealed shipping container, or both.

Until recently it has been the common practice to apply a temporary lead sheath to these cables at the factory and to remove the sheath at the time of installation just as the cable is being pulled into the pipe. This is a time-consuming and uneconomical procedure. The lead sheath must be applied at the factory, the shipping weight of the cable is greatly increased as compared to the weight of the cable without the lead sheath, the lead sheath must be removed in the field and then the scrap lead must be returned to the factory.

A copending application of Ralph W. Atkinson and Martin H. McGrath for Insulated Electric Power Cables, filed July 23, 1947, Serial No. 763,001, assigned to the assignee of the present application, discloses an improved cable to be pulled into pipe. According to that invention the temporary lead sheath is dispensed with and the cable is supplied at the factory with a flow-limiting layer or covering which is light in weight as compared to a lead sheath, which will not be removed from the cable at the time of installation and which adequately protects the cable insulation. The flow-limiting layer is a composite structure made up of copper or aluminum tapes and synthetic tapes, at least one thickness of metal tape desirably separating the synthetic material from the overlying skid wires. The synthetic material may be polyethylene.

When a flow-limiting layer or other covering on the cable is relied upon to protect the cable insulation against loss of oil and entrance of moisture it will be obvious that the cable ends also must be sealed against loss of oil and entrance of moisture from the time of manufacture until the cable is installed. The end of the cable to which the pulling eye is attached requires a seal between the flow-limiting layer and the pulling eye, whereas a simple cap sealed to the flow-limiting layer will suffice at the other end.

Sealing the ends of cable constructed in accordance with the disclosure in the Atkinson & McGrath application is complicated by the fact that the cable has no one-piece metal sheath to which a soldered or wiped joint may be readily made, and by the further fact that the temperature which may be employed in making the seal is limited to the temperature to which the underlying synthetic material may be safely subjected without melting or other change. Polyethylene softens rather suddenly at about 104° C. and its service temperature generally is considered to be about 85° C. This fact limits the safe temperature which may be employed in sealing the ends of cables which include polyethylene in the flow-limiting layer to a figure not greatly in excess of 85° C. This precludes the making of soldered or wiped joints to the flow-limiting layer.

According to the present invention a pulling eye and cap may be attached to one end of the cable and a cap to the other end and both caps may be sealed to the flow-limiting layer by fused metal points without danger of damage to the flow-limiting layer.

The invention will be best understood from the following description when read in the light of the accompanying drawings showing specific embodiments of the invention selected merely for descriptive purposes. In the drawings:

Figure 1 is a longitudinal sectional view through a pulling eye attached to a cable end; and Figure 2 is a longitudinal sectional view through an end cap attached to a cable.

As may be seen in Figure 1, the cable of the illustrative embodiment comprises a stranded conductor 11, an enclosing body of insulation covered by a flow-limiting layer 13 and two D-shaped skid wires 14.

In applying a pulling eye to the cable the skid wires 14 are unwound for a distance of about 4 or 5 inches from the end of the cable. Next the flow-limiting layer 13 and the underlying insulation are removed to expose about 4 or 5 inches of the end of the conductor 11. The end of the insulation desirably will be cut off square as shown in Figure 1. The unwound ends 15 of the skid wires 14 then are laid along the exposed cable conductor 11.

A piece of lead sheath or pipe 19 about a foot long having an internal diameter which is only slightly larger than the diameter of the cable over the skid wires is slipped on to the end of the cable and pushed back from the end. Pulling eye 17 is applied to the end of conductor 11 and the ends 15 of skid wire 14 and is firmly secured thereon by a filling 18 of solder, in the usual manner. Securing the ends 15 of the skid wires in the pulling eye anchors the skid wires so that they cannot loosen and slide or bunch up as the cable is pulled into the pipe.

The sheath 19 then is moved forward until its front end overlies the pulling eye. If the diameter of the pulling eye is substantially less than that of the cable the forward end of the lead sheath 19 may be tapered in known manner by cutting the end in scallops and hammering the scallops in against the pulling eye. The end of the sheath 19 overlying the pulling eye is united to the pulling eye with a wiped solder joint 20. This completes the physical connection of the pulling eye to the cable. The skid wires are anchored and the pulling eye 17 is sealed to one end of the lead sheath 19, but the other end of this sheath still is open.

Next, the space within the sheath 19 surrounding the cable end is filled with molten material 21 which will effect a seal for the capped cable end. This material must be one which in its molten state will not damage the polyethylene and which upon solidifying will form a good seal both to the inner wall of the lead sheath 19 and to the exterior of the flow-limiting layer 13. Preferably a low melting point alloy metal will be used for this purpose.

One such metal suitable for this purpose is an alloy having the following composition:

|  | Percent |
|---|---|
| Lead | 26 |
| Tin | 13 |
| Cadmium | 12 |
| Bismuth | 49 |

This alloy metal has a melting point of 70° C. (158° F.).

It may be advisable to preheat the lead sheath slightly before pouring the molten metal into it, so as to avoid any possibility of the metal freezing before the sheath is filled. The heating might be to a temperature of about 40°–50° C.

Application of an end cap or seal without a pulling eye may be similarly made, the principal difference being that one end of the lead sheath is closed with a lead wipe to constitute a cap instead of being left open to slide over the pulling eye.

Referring to Figure 2 of the drawing, there is shown a cable having a flow-protecting covering 31 and two D-shaped skid wires 32. A short length of lead sheath 34, its end closed with lead wipe 35 to form a cap, is slipped on to the cable end and then filled from the rear end with a low melting point alloy metal 36 such as has been described in connection with Figure 1 and in similar manner.

The invention may be variously modified and embodied within the scope of the subjoined claims.

I claim:

1. The combination with an insulated electric cable, from one end of which the outer coverings and insulation have been removed to expose a short length of the conductor, of a pulling eye connected to the bared conductor end, a short length of lead sleeve only slightly larger than the cable overlying and covering both the rear end of the pulling eye and the end of the cable, a wiped joint sealing the forward end of the lead sleeve to the pulling eye, and a body of a low melting point alloy metal filling the lead sleeve from its other end.

2. The combination set forth in claim 1, in which the cable has exteriorly applied skid wires, and in which the ends of the skid wires are laid along the exposed conductor end and anchored with the conductor end in the socket of the pulling eye.

3. The method of applying a pulling eye to an insulated electric cable which comprises removing the outer coverings and insulation from one end of the cable to expose a short length of the conductor, sliding a lead sleeve only slightly larger than the cable over the cable end, connecting the bared conductor end to the pulling eye, sliding the lead sleeve forward until it covers both the end of the pulling eye and the end of the cable, wiping the forward end of the lead sleeve to the pulling eye and filling the lead sleeve through its other end with a low melting point alloy metal.

4. The method of applying a pulling eye to an insulated electric cable which comprises removing the outer coverings and insulation from one end of the cable to expose a short length of the conductor, sliding a lead sleeve only slightly larger than the cable over the cable end, connecting the bared conductor end to the pulling eye, sliding the lead sleeve forward until it covers both the rear end of the pulling eye and the end of the cable, sealing the forward end of the lead sleeve to the pulling eye and filling the lead sleeve through its other end with molten material which, upon cooling, effects a seal between the exterior of the cable and the interior of the lead sleeve to prevent penetration of moisture into the cable end.

5. The method of applying a pulling eye to an insulated electric cable having a flow-limiting layer and exteriorly applied skid wires according to claim 4 in which the ends of the skid wires are laid along the bared conductor end and anchored in the pulling eye socket with the conductor end.

ADAM A. BRONOVICKI.

REFERENCES CITED

The following references are of record in the file of this patent:

UNITED STATES PATENTS

| Number | Name | Date |
|---|---|---|
| 1,293,383 | Eaton | Feb. 4, 1919 |
| 2,132,259 | Emanueli | Oct. 4, 1938 |
| 2,174,218 | Greene | Sept. 26, 1939 |
| 2,222,748 | Komives et al. | Nov. 26, 1940 |
| 2,282,003 | Scott et al. | May 5, 1942 |

FOREIGN PATENTS

| Number | Country | Date |
|---|---|---|
| 559,924 | England | Mar. 10, 1944 |

OTHER REFERENCES

Thews, E. R., Metallurgy of White Metal Scrap and Residues (1930), page 103. D. Van Nostrand Co., New York (Copy in Division 3, U. S. Patent Office).